United States Patent [19]
Sandrock et al.

[11] 3,866,969
[45] Feb. 18, 1975

[54] OPERATOR'S COMPARTMENT WITH SWINGING WINDOW

[75] Inventors: Don G. Sandrock, McHenry; Roy E. Kline, Wadsworth, both of Ill.

[73] Assignee: Fiat-Allis Construction Machinery, Inc., Milwaukee, Wis.

[22] Filed: Aug. 16, 1973

[21] Appl. No.: 388,973

[52] U.S. Cl. .............................. 296/28 C, 296/146
[51] Int. Cl. ...................... B60j 1/00, B62d 33/06
[58] Field of Search............ 296/102, 78 R, 82, 146, 296/28 C

[56] References Cited
UNITED STATES PATENTS

| | | | |
|---|---|---|---|
| 1,142,061 | 6/1915 | Scott | 296/78 R |
| 1,689,765 | 10/1928 | Baxter | 296/28 C |
| 2,479,036 | 8/1949 | Campbell | 296/28 c |
| 2,969,255 | 1/1961 | Nystrom | 296/102 |
| 3,410,599 | 11/1968 | Kettler | 296/28 C |

Primary Examiner—Robert B. Reeves
Assistant Examiner—Francis J. Bartuska

[57] ABSTRACT

The rear window panel structure of an operator's compartment is hinged at its upper part on a transverse axis to a basic operator's compartment structure so that it may swing upwardly and rearwardly to permit the engine hood of the vehicle to be removed as may be necessitated from time to time for repairs and servicing. The outward swinging rear window panel structure affords an emergency exit for persons in the compartment and it may also be opened to provide ventilation. In order that the same basic compartment structure may be utilized on several different vehicle models which have different engine hood sizes, a vertically adjustable adapter plate is made available for installation at the lower end of the rear window panel structure. Also, a pair of side panels are provided at opposite sides of the engine hood which are adjustable laterally relative to the basic compartment structure to accommodate differences in the widths of engine hoods.

7 Claims, 3 Drawing Figures

3,866,969

OPERATOR'S COMPARTMENT WITH SWINGING WINDOW

BACKGROUND OF THE INVENTION

Heretofore others have provided enclosed compartments for vehicle operators wherein window panels are hingedly connected to the wall structure to permit the window to be swung out thereby allowing circulation of air. In order to remove the hood for the engine in prior constructions, it has been necessary to remove a rear wall or cross brace member or both in order to permit the hood to be raised upwardly or removed for servicing and repair of the engine and associated vehicle components. The removal of the additional walls and braces of the operator's compartment is expensive and time consuming, which not only makes the repair and servicing more expensive but takes the vehicle out of service for an excessive period of time thereby reducing its usefulness to the owner.

BRIEF DESCRIPTION OF THE INVENTION

In the present invention the rear window panel structure can be swung upwardly and rearwardly out of the way of the engine hood. The engine hood can then be removed to permit servicing and repairing of the engine and the associated area of the vehicle. If desired, side panels adjacent the laterally opposite sides of the hood can also be removed to allow the serviceman additional working space. The basic compartment structure does not include a cross brace in the rear wall area and thus the extra expense and time to remove such a member is eliminated.

DETAILED DESCRIPTION OF THE INVENTION

Figure 1:
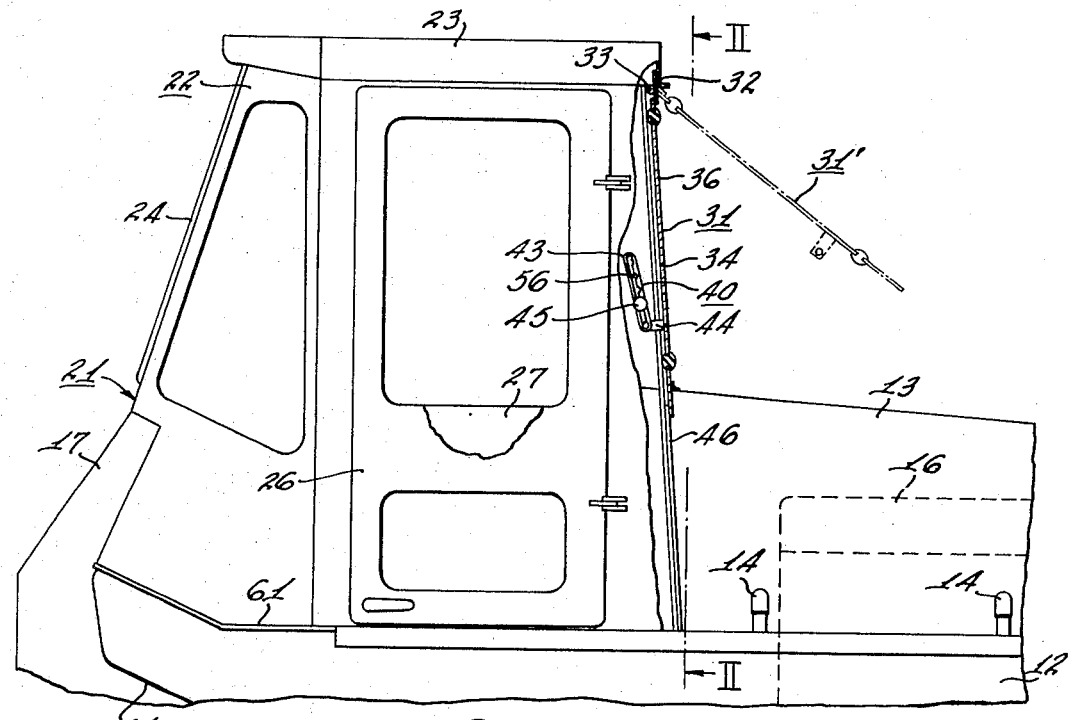
FIG. 1 is a side view of a part of a front end loader vehicle on which an operator's compartment incorporating the present invention has been installed.
Figure 2:
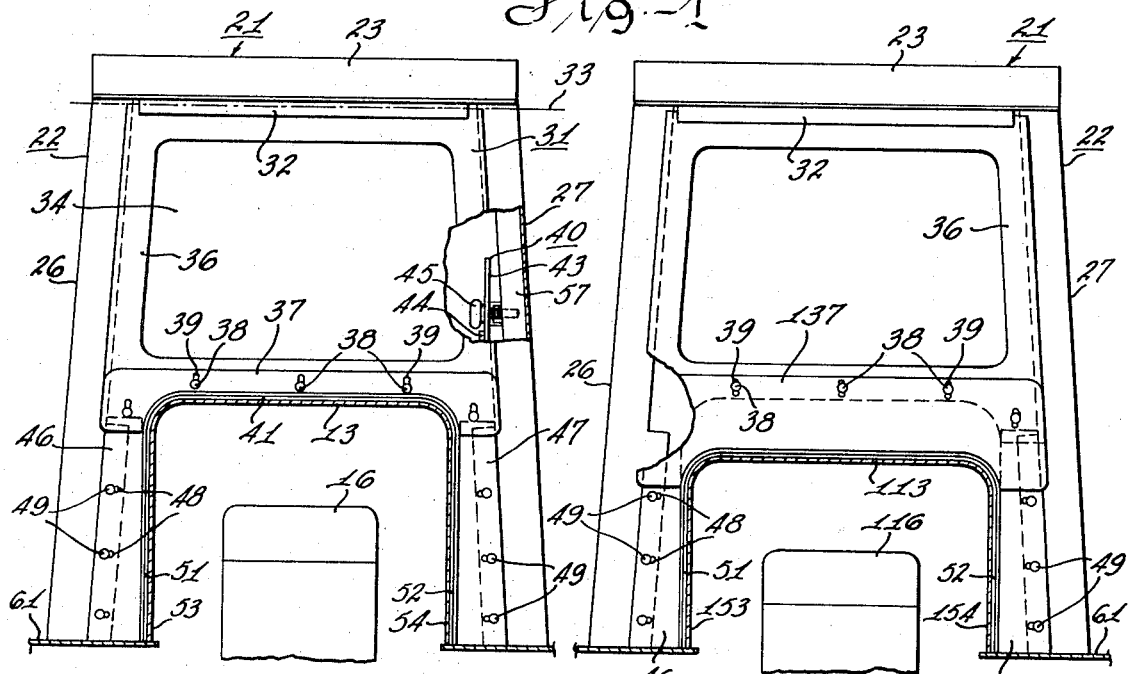
FIG. 2 is a section view taken along the line II—II in FIG. 1.

Referring to FIGS. 1 and 2, a rubber tired loader 11 is provided with a main frame 12 to which an engine hood 13 is releasably secured by latches 14 of conventional construction. The hood is disposed in protective relation to the vehicle power unit in the form of an internal combustion engine 16 which is mounted on the frame 12 of the vehicle in a conventional manner. A control console 17 is secured to the vehicle frame 12 forwardly of the engine 16 and hood 13. An operator's compartment 21 incorporating the present invention is installed on the vehicle to provide protection for the operator. The illustrated compartment 21 includes a basic compartment structure 22 comprised of a top 23, a front wall 24 and a pair of side walls 26, 27. As illustrated, side wall 26 comprises a door.

A rear window panel structure 31 is pivotally connected at its top by a piano hinge 32 to the basic structure 22 for upward and rearward swinging movement about a transverse pivot axis 33 between a closed position to an open position, illustrated in solid lines, to an open position illustrated in phantom by broken lines 31'. The rear window panel structure 31 includes a rear window panel 36, in which a window 34 is installed, and an adapter panel 37. The adapter panel 37 is releasably secured to the rear window panel 36 by capscrews 38 extending through vertically elongated slots 39 in the adapter panel 37 and threadedly engaging drilled and tapped openings in the lower portion of the rear window panel 36. The adapter panel 37 is vertically adjustable, by virtue of the slot 39, relative to the rear window panel 36, to insure the proper engagement between a flexible seal 41 on the bottom edge of the adapter panel 37 and the engine hood 13. Also, the vertically adjustable adapter panel 37 permits the rear window panel structure 31 to accommodate manufacturing tolerances as well as slightly different height hoods that may be employed on different vehicle models. A releasable latch mechanism 40 is provided at each of the laterally opposite sides of the rear window panel 36 which includes a slotted link 43 pivotally connected to a bracket 44 on the rear window panel 36 and an internally threaded knob 45 threadedly engaging a threaded stud secured to the basic compartment structure 22.

Figure 3:
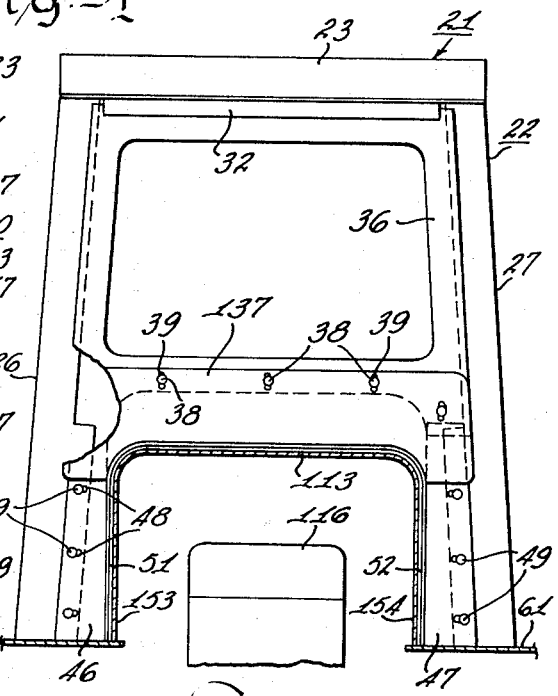
FIG. 3 is a view similar to FIG. 2 but showing a modification of the present invention.

If the vehicle uses a substantially smaller engine hood, such as hood 113 illustrated in FIG. 3, an adapter panel 137 with somewhat greater vertical dimension is employed to accommodate the smaller hood 113. The adapter panel 137 is releasably secured to the rear window panel 36 in the same manner as adapter panel 37 is secured to the rear window panel 36 in FIG. 2. In FIGS. 2 and 3, it will be noted that the adapter panels 37 and 137 are disposed in lapped engagement with side panels 46, 47 disposed at opposite sides of the hoods 13, 113. The side panels 46, 47 have transversely elongated slots 48 permitting lateral adjustment relative to the basic compartment structure 22 to which the side panels are secured by capscrews 49. The side panels 46, 47 have flexible sealing elements 51, 52 at their laterally inward edges which are in sealing engagement with the vertical sidewalls 53, 54 of hood 13 and with the sidewalls 153, 154 of hood 113.

OPERATION

When it is desired to open the rear window panel structure 31 for ventilation the knobs 45 of the two latch mechanisms 40 are loosened and the rear window panel structure 31 is pivoted rearwardly a few degrees (within the limits of the slot 56 in link 43). The knobs 45 are then retightened to hold the rear window panel structure 31 in its partly open ventilating position. The adapter panel 37 secured to the rear panel 36 is a part of the rear panel structure 31 and thus swings upward and rearward away from the hood 13 and away from the side panels 46, 47 which remain secured to the basic compartment structure 22.

If it is desired to swing the rear window panel structure 31 to a fully open position, such as is illustrated by broken lines 31' in FIG. 1, the knobs 45 are removed and the rear window panel structure 31 is swung rearwardly to the limit allowed by links 43. Then the links 43 are sprung laterally inward so they are disengaged from the inwardly extending studs to which the knobs 45 are secured. The rear window structure is then free to be pivoted to an open position wherein it does not interfere with raising or removal of the hood 13. If the hood 13 has upwardly converging side walls it will be necessary to loosen or remove the side panels 46, 47 prior to raising the hood 13.

The illustrated operator's compartment may incorporate a rollover protection frame 57 to which the top, side walls and front wall are secured. Such a construction is shown in a copending patent application of William J. Dobeus, Daniel Pacheco, Carl A. Keyzer, James V. Cheetham and Don G. Sandrock entitled Rollover Protection Apparatus. As an added measure of safety the rear window panel structure 31 of this invention may be opened to afford an additional, emergency exit from the operator's compartment.

A family of vehicles such as rubber tired loaders may be designed to use the same control console 17 and the same operator's compartment platform 61 on the frame 12. However, due to differences in engine size it is desirable to use different size engine hoods. The present invention permits the same basic compartment structure 22, the same rear window panel 36 and the same side panels 46, 47 to be used in vehicles of different size and capacity. The only part of the operator's compartment which may need to be different from others is the adapter panel.

The embodiments of the invention in which an exclusive property or privilege is claimed are defined as follows:

1. An operator's compartment for a motor vehicle of the type having a removable engine hood, said compartment comprising:

a basic structure including a top and side walls, a window panel structure pivotally connected near its top to said basic structure for outward and upward swinging movement about a transverse axis between closed and open positions and having a bottom sealing edge adapted to sealingly engage the top of said hood, and side panels releasably secured to said basic structure having laterally inward seal edges adapted to sealingly engage opposite sides, respectively, of said hood and having top portions in lapped engagement with laterally spaced bottom portions of said window panel structure when the latter is in its closed position, said side panels being laterally adjustable relative to said basic structure.

2. The compartment of claim 1 wherein said window panel structure includes a window panel, a vertical adapter panel which incorporates said bottom sealing edge and fastening means releasably connecting said adapter panel to said window panel.

3. The compartment of claim 2 wherein said fastening means permit said adapter panel to be adjusted vertically relative to said window panel.

4. The compartment of claim 3 wherein said side panels are laterally adjustable relative to said basic structure.

5. The compartment of claim 1 and further comprising a pair of latch means operatively associated with said basic structure and with laterally opposite sides, respectively, of said window panel structure operable to releasably hold the latter in its closed position.

6. An operator's compartment for a motor vehicle of the type having a removable engine hood, said compartment comprising: a basic structure including a top and side walls, a window panel structure pivotally connected near its top to said basic structure for rearward and upward swinging movement about a transverse axis between closed and open positions and having a bottom sealing edge adapted to sealingly engage the top of said hood, said window panel structure including a window panel, a vertical adapter panel which incorporates said bottom sealing edge and fastening means releasably connecting said adapter panel to said window panel, said fastening means permitting said adapter panel to be adjusted vertically relative to said window panel, and side panels releasably secured to said basic structure having laterally inward seal edges adapted to sealingly engage opposite sides, respectively, of said hood and having top portions in lapped engagement with laterally spaced bottom portions of said vertical adapter panel of said window panel structure when the latter is in its closed position, said side panels being laterally adjustable relative to said basic structure.

7. The compartment of claim 6 and further comprising latch means operatively associated with said basic structure and with said window panel structure and operable to releasably hold the latter in its closed position.

* * * * *